United States Patent [19]
Beatty

[11] Patent Number: 5,091,718
[45] Date of Patent: Feb. 25, 1992

[54] COLOR-MONOCHROME VISUAL DISPLAY DEVICE

[76] Inventor: Paul H. J. Beatty, Craigievar, 3 Mossend, West Calder, West Lothian, Scotland

[21] Appl. No.: 301,894

[22] Filed: Jan. 26, 1989

[30] Foreign Application Priority Data

Jan. 29, 1988 [GB] United Kingdom ............ 8802002

[51] Int. Cl.$^5$ ............................................ G09G 1/28
[52] U.S. Cl. .................................... 340/703; 340/701; 358/72; 358/73
[58] Field of Search ............... 340/701, 702, 703, 771, 340/772, 773, 781, 783; 313/371, 384, 386, 385, 463, 467, 472, 473, 525, 527; 358/72, 73

[56] References Cited

U.S. PATENT DOCUMENTS

| | | | |
|---|---|---|---|
| 3,517,243 | 6/1970 | Jones | 358/72 |
| 3,622,826 | 11/1971 | Royce | 313/92 |
| 3,857,037 | 12/1974 | Tomii et al. | 313/371 |
| 4,155,030 | 5/1979 | Chang | 340/781 |
| 4,170,772 | 10/1979 | Bly | 340/783 |
| 4,582,396 | 4/1986 | Bos et al. | 340/702 |
| 4,612,483 | 9/1986 | Washington | 358/73 |
| 4,716,403 | 12/1987 | Morozumi | 340/703 |

FOREIGN PATENT DOCUMENTS

| | | |
|---|---|---|
| 1201049 | 8/1970 | United Kingdom . |
| 1467812 | 3/1977 | United Kingdom ......... 358/73 |
| 2174536 | 11/1986 | United Kingdom ......... 358/73 |

Primary Examiner—Ulysses Weldon
Assistant Examiner—M. Fatahiyar
Attorney, Agent, or Firm—Kerkam, Stowell, Kondracki & Clarke

[57] ABSTRACT

Figure 2:
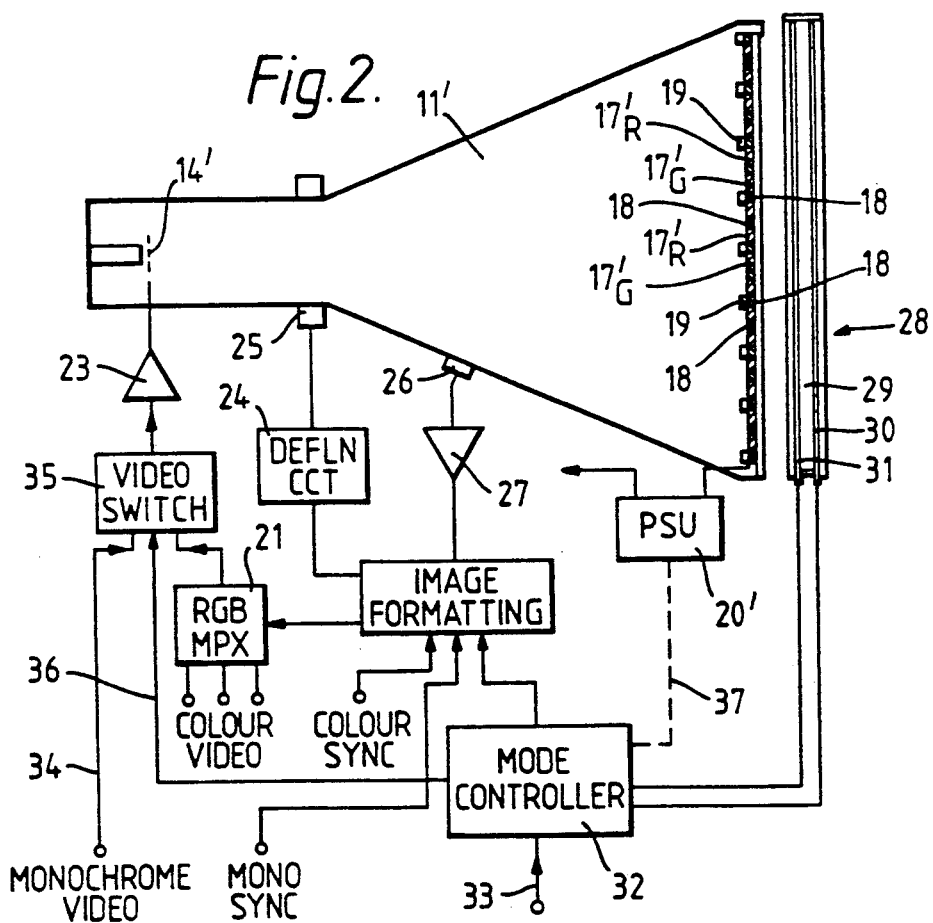

A multiple color imaging device such as a beam index CRT (FIG. 3a/b), with red, green and blue phosphor stripes arranged in triplets each defining one color image pixel in the line scan direction having at least the red and green phosphor stripes coated with an electrically insulating barrier layer 38 on which is formed a thin layer 39 of blue emitting phosphor. In color display mode the beam energy is sufficient to penetrate the barrier layer and excite the principal stripe phosphor to give the desired color emission but also excites the blue phosphor, blue emissions being perceived at lower luminance than the red and not detrimental to perceived color purity. In monochrome mode the beam energy is reduced to excite only the blue phosphor. As each stripe is able to emit blue when excited the image resolution for monochrome is increased from color triplet dimensions to individual stripe dimensions or better. The low level of blue emissions is suitable, and preferred, for night viewing of FLIR images, particularly with night vision goggles. Individual phosphor grains may be given a skin of the monochrome phosphor (FIG. 4) or it may be mixed with the principal phosphor without a barrier but with a red/green filter in front of the screen for monochrome operation (FIG. 2).

19 Claims, 2 Drawing Sheets

COLOR-MONOCHROME VISUAL DISPLAY DEVICE

This invention relates to visual display devices of the type producing a multiple colour image as a two dimensional array of image pixels, each pixel being defined by an addressable group of individually energisable colour emitters each emitter being associated with a physically discrete region of display area and energisable alone or with others to define emission of primary or secondary colours respectively from the group. Such visual display devices will hereinafter be referred to as "of the type defined".

Examples of visual display devices of the type defined include Beam Index colour CRT's, in which the energisable colour emitters comprise fluorescent phosphor materials excitable to produce visible light of a colour determined by the phosphor composition by an electron beam following a direct path through a funnel-like evacuated envelope or a labyrinthine path through a flattened envelope, a vacuum- fluorescent device in which the energisable colour emitters comprise phosphor targets spaced from individual sources of electron beams in a flat panel, and organised into a regular matrix of emitters from which groups are defined, a gas plasma device in which the energisable colour emitters comprise individual cells of a regular matrix of cells from which the groups are defined, the individual cells being capable of energisation by addressing electrodes to form discharges in gases contained therein and generate electromagnetic radiation or charged particles capable of exciting fluorescent phosphor materials associated with the individual cells, electroluminescent devices in which the colour emitters comprise electroluminescent material across which an electric field can be defined between positionally defined electrodes to produce light of appropriate colours to define a group, and liquid crystal devices in which energisable colour emitters are portions of suitable crystal structures and materials, possibly including dyes, subjected to be an electric field defined by positionally defined electrodes to cause the crystal to exhibit a particular primary colour or become transparent or opaque to passage of light of that primary colour from a separate associated source.

What such visual display devices of the aforementioned type have in common for producing multiple colour images is the grouping together in close physical proximity of discrete and individually energisable primary colour emitters so as to define for the group by selective energisation of the appropriate component emitters either simultaneously or sequentially (and depending upon persistence of emission or vision) an emission comprising a primary colour if only one emitter is energised or a secondary colour if more than one emitter is energised.

Clearly, because of the physical dimensions of each region of the display associated with each such energisable colour emitter, the region of the display associated with each such group is considerably larger and therefore the smallest area into which a displayed image can be resolved, the colour image pixel, is the area occupied by the group.

Furthermore it will be realised that resolution cannot necessarily be improved by reducing the group size through reducing display areas of the individual energisable colour emitters as they may be subject to dimensional constraints imposed by their emission efficiency and or the means by which the emitters are energised to produce a desired level of light output.

The invention is particularly concerned with the limited ability of such known multiple-colour image display device to display monochrome images also to a satisfactory degree of resolution.

For clarity of description and to avoid confusion through the use of differing terminologies for different forms of visual display device of the type defined the specification is hereinafter essentially confined to an exemplary form of display device as provided by a CRT and more specifically a beam index CRT.

In military uses amongst others CRT's are used as display devices to present information because of the versatility of image forms and colours that can be formed.

However the conditions in which such military CRT's have to operate, in terms of space available for the display, viewing conditions and material to be displayed, means that such tubes presently employed are but a compromise of conflicting requirements.

Display CRT's are required to produce high resolution full-colour displays for computer generated symbols, colour camera and colour map reproduction in ambient lighting conditions varying from bright daylight to darkness.

Beam-index (BI) CRT's are preferred to shadowmask (SM) types in order to provide the higher luminance suited to daylight viewing and the image resolution is limited only by the screen structure of groups of energisable colour emitters, that is, the triplets or triads of primary-colour-emissive phosphor stripes or equivalent, each group or triplet defining one pixel of the display in a line scan made across them by an energising, or exciting, electron beam.

Display CRT's are required also to produce images derived from Forward Looking Infra Red (FLIR) imagers or other equivalent imagers, usually in conditions of low ambient illumination when night vision goggles (NVG) are also in use.

Although such IR images are normally produced in signal form for monochrome display space considerations often preclude the use of a separate display CRT and as a compromise the monochrome IR image is displayed on the colour CRT. However, colour CRTs require special filters to prevent interference with the sensitivity of the NVGs due to overlapping NVG response with the emission of the phosphors, mainly the red phosphor, of the colour CRT and the image resolution available from a colour CRT is limited by its discrete phosphor structure, that is, formation in triplets of the three primary colour emitting phosphors, so that a monochrome image, whether in one of the primary colours or a mixture of these, is not available with the usually greater resolution defined by the imager and which would be available from a truly monochrome CRT, where the resolution is a function not of the phosphor layout but of the scanning electron beam diameter. One additional advantage shown by a truly monochrome CRT is an even further resolution improvement, that is, pixel dimension, available in viewing conditions of low ambient illumination by the use of a low electron beam current and correspondingly smaller spot size generated on the screen. Such a facility is not available when restricted by the triplet structure of a colour CRT where resolution is limited by the dimensions of the triplet structure and colour differences not the usable beam current.

Bearing in mind the generality of this situation with respect to any multiple colour visual display devices of the type defined in which pixel size is limited by the group structure of discrete energisable primary colour emitters, such as the excitable phosphor stripe triplets, it is an object of the present invention to provide a display device incorporating a visual display device of the type defined which provides multiple colour image display capability and mitigates the disadvantages of known arrangements regarding resolution for monochrome images produced thereon.

In this specification the terms red phosphor, green phosphor and blue phosphor are used for convenience indicating the accepted colour of light principally emitted by excitation of those phosphors, the phosphors themselves being of any known composition suitable to effect the colour emission, and the term coloured phosphor, where used is intended to indicate a phosphor which is chosen in accordance with the colour of visible radiation it is desired to be emitted upon excitation.

It will also become apparent that the invention is not limited to emission from phosphor materials and where other forms or dyes employed as colour filters are referred to by their colour, it is in the context of the colour of light emitted or passed thereby.

According to the present invention a display device includes a multiple colour visual display device of the type defined adapted to provide a monochrome visual display by emission of radiation at a predetermined monochrome part of the spectrum, said display device having groups of individually energisable colour emitters, individual or combined emissions thereof defining said multiple colours, and at least some emitters of each group emitting light in other than said monochrome part of the spectrum, means to address said groups in accordance with formation of a two dimensional image by energising the emitters of the groups and, associated at least with the colour emitters of other than said monochrome radiation, an energisable monochrome emitter of light in the monochrome part of the spectrum at a lower luminous intensity than the principal colours of the colour emitters with which associated, mode control means operable to cause the display of colour images by causing the energisation of the emitters of said groups in accordance with the image colour to be generated to produce said principal coloured light at greater luminous intensity than any emission from the associated monochrome emitter energised therewith and to cause the display of monochrome images by causing the image to be formed by energisation of the individual emitters irrespective of their principally emitted colour and to limit light emission from any such emitter energised to that provided in the monochrome part of the spectrum.

The visual display device may be a beam index CRT.

Figure 1:
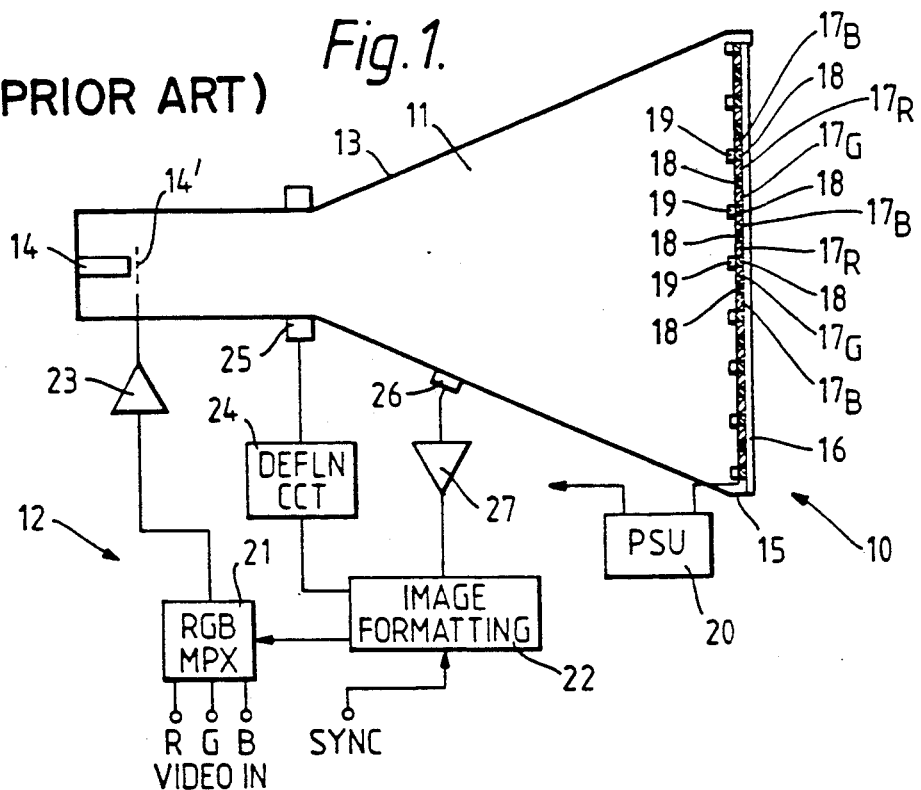
Figure 3A:
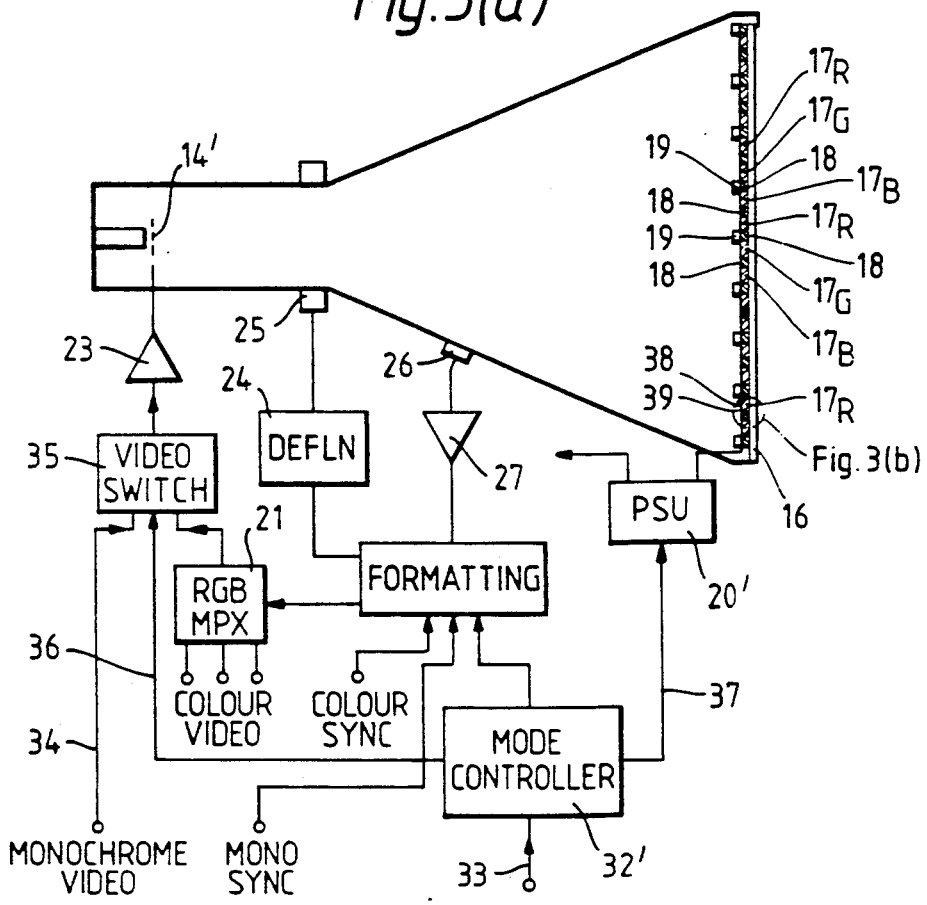
Figure 3B:
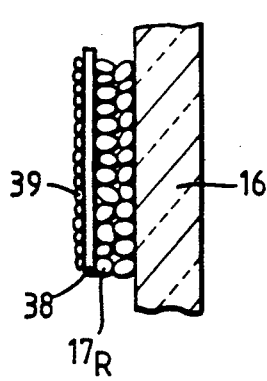
Figure 4:
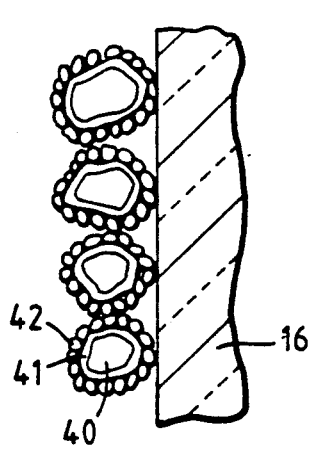
Figure 5:
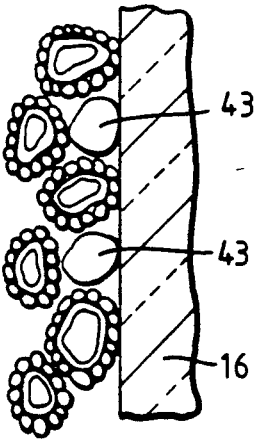

Embodiments of the present invention will now be described by way of example with reference to the accompanying drawings, in which:

FIG. 1 is schematic representation of a conventional colour visual display system including a beam index CRT, showing the distribution of coloured phosphors in stripes, and driving and controlling circuits therefor, FIG. 2 is a schematic representation of one form of visual display device according to the invention showing a modified form of beam index CRT and controlling circuitry, FIG. 3(a) is a schematic representation of another form of visual display device according to the present invention, FIG. 3(b) is an enlargement of a portion of the phosphor carrying screen thereof, FIG. 4 shows a similarly enlarged cross section through a portion of a part of a different form of phosphor-carrying screen thereof, and FIG. 5 shows an enlarged cross section through a part of yet a different form of phosphor-carrying screen.

Referring to FIG. 1, a visual display device 10 for displaying multiple, that is full, colour raster scan television-type images comprises a beam index (BI) CRT 11 and associated driving and controlling circuitry 12 both of which are well known and only described here in outline.

The CRT comprises an evacuated envelope 13 containing a single electron gun 14 forming a cathode, a control grid 14' and electron accelerating and beam focussing electrodes (not shown) by which an electron beam is formed between the cathode and a final anode 15 carried adjacent a screen portion 16 on which is formed stripes of red, green and blue phosphors $17_R$, $17_G$, $17_B$ respectively, separated from each other by guard stripes 18. The colour-emitting phosphor stripes are grouped in a repetitive sequence of triplets each comprising one phosphor of each colour. As explained above, reference in the specification to a phosphor by colour is intended to refer to the colour of the visible radiation principally emitted by that phosphor when excited by an electron beam, accelerated between the electron gun and anode, impinging upon it.

The beam is focussed so that it impinges on the screen as a circular or an elliptical spot dimensioned in the direction of stripe width slightly larger than the stripe width, thereby producing the maximum amount of excitation of the phosphor of a stripe on which it impinges whilst the colour purity of the emitted light is preserved by the guard bands separating adjacent stripes of different colour phosphors.

At intervals across the screen indexing stripes 19 are formed of a phosphor or other material which responds to excitation by the electron beam to emit radiation, which may be invisible, or effect secondary electron emission back into the tube envelope and such indexing stripes may be carried on the guard stripes 18 or assume a part of the sequence of colour stripes.

The control circuitry 12 includes an power supply unit (PSU) 20 for producing a potential difference between the anode 15 and cathode by which the electron beam energy is defined and thus the light output of the CRT or brightness or luminances of the displayed image. The image is formed, that is, given contrast, by modulation of the beam current by component 'red', 'green' and 'blue' video signals from some source, such as a camera or computer graphics generator, at video multiplexer 21 which, in accordance with colour sync. signals from a formatting circuit 22, applies each of the 'colour' signals in turn to a video amplifier 23 and hence to the control grid 14' of the CRT to modulate the electron beam current. The formatting circuit may also receive synchronising signals with the video signals from their source.

The circuitry 12 includes a beam deflection generator and amplifier 24, also synchronised with the formatting circuit 22, and deflection coil means 25 which causes the electron beam to effect a repetitive line scan across the phosphor stripes perpendicular to their length, that is, within the plane of the Figure. Orthogonal Field scanning circuits also exist but are not shown to avoid complexity.

A photodetector, or if appropriate, a secondary emission detector, 26 is disposed to receive emissions of the indexing stripes 19 and an indexing signal generated therein and applied by way of amplifier 27 to the formatting circuit 22 represents the crossing of the indexing stripes by a line scanned electron beam.

The fixed spatial relationships between the colour phosphor stripes and the indexing stripes enables the formatting means to provide a signal synchronised with the electron beam scanning the red, green and blue phosphor stripes whereby the multiplexer can gate 'red', 'green' and 'blue' video signals in synchronism with the beam crossing the respective phosphor and produce the colour image by varying the electron beam current with those video signals.

As stated above such a CRT display as outlined is well known and preferred to the shadow mask tube as being more rugged and able to give greater luminance in the absence of a shadow mask although the associated circuitry may be more complex.

In order to use such a tube for displaying monochrome images, whether in one of the primary colours of the phosphors or some secondary colour produced by combination of emission from them, it will be seen that the smallest resolution available from the screen structure is the width of a 'triplet' of three adjacent phosphor stripes and the intervening guard stripes.

The performance of such a display as outlined is thus less than satisfactory for viewing a monochrome image generated to higher resolution by an infra-red (IR) or other sensor, particularly when in the conditions of darkness or other low ambient illuminations of such sensor use the display is viewed in combination with night vision goggles (NVG's) whose sensitivity is compromised by the emissions of the red phosphor of the CRT.

In accordance with the present invention the CRT is modified by providing a non-red, that is a blue or green, emissive phosphor in association with both the red phosphor stripes and the remaining green or blue phosphor it differs from, such blue or green emissive phosphor comprising monochrome phosphor, as the term is used in this specification. The monochrome phosphor may also be associated with the colour phosphor it ostensibly corresponds to so that the additional monochrome phosphor may differ in emission colour from all of the existing phosphors, but particularly the red. Such phosphor may be electrically isolated and deposited on the primary phosphors either as a coating on the individual grains or over the stripe, spatially isolated by occupying a discrete area otherwise occupied by the associated primary colour phosphor or may be mixed with the principal colour phosphors. Also control means is introduced into the display circuitry to effect operation either as a conventional full-colour BI CRT of normal resolution or as a blue or green monochrome display of higher resolution.

It is conventional to refer to the colours of the light emitted by the phosphor stripes, and thus the phosphors themselves as the primary colours. However it will be seen that in accordance with the present invention more than one phosphor type may be present in a particular stripe and emit more than one colour. To avoid confusion the terms principal phosphor and principal colour are used to refer to the phosphor and colour emitted thereby which forms the greatest part of a particular stripe and its emission.

A first embodiment of a display according to the invention is shown in FIG. 2 and many of the parts correspond to, and are given the same reference numerals as, the arrangement of FIG. 1. To avoid unnecessary complexity of description the following embodiments are described in detail with the monochrome colour corresponding to the primary blue of the CRT.

The CRT 11' differs from 11 of FIG. 1 in that the red and the green phosphor stripes $17'_R$ and $17'_G$ both contain blue phosphor in sufficiently small quantities that when the phosphors of the stripes are excited by the scanned electron beam the principal stripe colours, that is, red and green, are observed with little contamination from the blue light emitted by excitation of the additional blue phosphor and to which the human vision is less sensitive, especially on high ambient illumination.

Externally of the CRT an electro-optic spectral filter 28 is provided between the screen and an observer, conveniently adjacent the screen portion 16 of the CRT envelope.

The electro-optic spectral filter 28 is of generally known form comprising a cell of liquid crystal or electrochromic material 29 enclosed between a pair of planar transparent electrodes 30, 31 coextensive with the screen.

The material 29, say a cholesteric liquid crystal, has one or more dyes, such as pleochloric dyes, incorporated whereby when the electrodes do not have a voltage applied between them the material absorbs light in the red and green bands of the spectrum, as emitted by the red and green phosphors, but not in the blue part of the spectrum. When there is an electric field between the electrodes the material is transparent to all the visible colours emitted by the tube phosphors.

The voltage applied to the electrodes of the electro-optic filter 28 to form the electric field defining its optical transmission mode is provided by a mode controller 32 which responds to a control signal, which may be manually or automatically initiated, on line 33 to change operation of the display between that of an image of full-colour video signals received at multiplexer 21 and a monochrome video signal received on line 34. A video switch 35 determines whether the monochrome video signal on line 34 or demultiplexed colour video signals from multiplexer 21 are applied to the CRT in accordance with a switch controlling signal on line 36 from the mode controller. The mode controller also responds to the control signal on line 33 to change the parameters of the formatting means 22 as to line and field scan rates and to effect synchronisation with the different source. Finally, the mode controller may, as an option, provide a switching signal on to line 37 the PSU 20', which is switchable between different beam energies, to select a lower one for the monochrome mode of operation as befits operation with low ambient light levels.

In the full colour display mode the mode controller configures the circuitry as described for FIG. 1, with the colour video signals from multiplexer 21 being passed by switch 35 to modulate the electron beam of the CRT 11' and with the electro-optic filter 28 energised so as to be transparent to all the colours emitted by the phosphors of the CRT. It will be appreciated that when the electron beam impinges on what are principally red or green emitting stripes then not only light of the principal colour but also the blue from the additional phosphor will be emitted but with its low relative perceived luminance, insufficiently to detract from the perceived principal colour purity.

In the monochrome mode the electro-optic filter 28 is de-energised and the electron beam scanned from stripe to stripe in the usual manner, but possibly at different rates of scan, the electron beam current being modulated in accordance with the monochrome video signal on line 34 to determine the degree of phosphor excitation at any stripe it impinges upon.

When the electron beam impinges on what are principally red or green emitting stripes 17'$_R$, 17'$_G$ the more efficiently emitted red or green light will be blocked by the de-energised electro-optic filter permitting only the lower luminance blue to be observed.

However, as remarked hereinbefore the need for such monochrome imaging, with IR and other sensors and/or when using NVGs, is in practice confined to conditions of low ambient illumination when it is desirable that the luminous emission of the display is low and towards the blue end of the spectrum.

The image resolution along each line is thus equal at least to the individual phosphor stripe pitch as opposed to conventional monochrome imaging with a colour CRT, or full colour imaging, wherein the image resolution is the pitch of triplet of phosphor stripes.

The blue phosphor stripes, whose composition and dimensions are chosen to match the luminous efficiency of the red and green phosphor stripes in full colour imaging will produce the component of blue monochrome image with correspondingly greater luminance than the lesser concentration of blue phosphor added to the green and red phosphors to avoid principal colour corruption and steps may be taken, in accordance with the beam indexing synchronisation, to reduce the scanned electron beam energy each time it crosses a blue phosphor stripe.

Alternatively, the electro-optic spectral filter may be adapted or an additional filter employed in the monochrome mode to reduce the luminance of the screen emissions selectively in response to applied electrical signals synchronised with the indexing signal to equalise the luminous output of the blue phosphor for all phosphor stripes.

In the above described construction the spectral filter is electrically de-actuated to effect colour filtering when the display is switched to operate in the monochrome mode. It will be appreciated that if the filter construction is appropriate and electrical de-actuation is required to render a normally red and green filtering material transparent then the filter may be de-actuated when the display is switched to operate in the full colour mode. The spectral filter need not be of the electro-optic type, electrically switched between the blue-transmissive and totally-transmissive states, and may for instance comprise a blue-only transmissive filter physically interposed before the screen in the monochrome image display mode manually or by mechanical means.

FIG. 3(a) shows a second embodiment of the display device according to the present invention and any parts corresponding to those in FIGS. 1 and 2 are similarly referenced.

The controlling circuitry is essentially the same as shown in FIG. 2, except for the omission of the spectral filter 28 and the essential inclusion of a switched level PSU 20' that is only optional in the embodiment of FIG. 2.

The CRT 11" differs from 11' in that the screen, a portion of which is shown in enlarged cross section in FIG. 3(b), is formed with phosphor stripes 17$_R$, 17$_G$, 17$_B$ of pure colour emission as in the conventional full colour tube 11. However, between the red and green phosphor stripes 17$_R$, 17$_G$ and the aluminum anode 15 is a barrier layer 38 of electrically insulating material on which is deposited a layer 39 of blue phosphor. The CRT functions to effect phosphor excitation and light emission from each stripe in the manner of the known penetration-type tube in that an electron beam of insufficient energy to penetrate the barrier layer excites only the blue phosphor to a level of luminosity consistent with the low beam energy, the relatively inefficient blue colour and the passage of emitted light through the unexcited red or green phosphors.

An electron beam of higher energy produces not only excitement of the blue phosphor layers but also penetrates the barrier and excites the more efficient red and green phosphors. The emissions from the red and green phosphors outweigh those of the blue phosphor layer to the extent that full colour operation may be effected with substantial colour purity despite the additional emissions from the also-excited blue layer.

To effect such dual mode operation the mode controller 32 responds to a colour mode control signal on line 33 to switch the PSU to provide a high energy electron beam, capable of penetrating barrier 38 and exciting the principal red or green phosphors as well as the overlying blue ones, and to cause the video switch 35 to apply colour video signals to the CRT beam current control grid.

The mode controller 32' responds to a monochrome mode signal on line 33 to switch the EHT generator to provide a lower energy electron beam which is incapable of penetrating barrier 38 and so only capable of exciting the blue phosphor layer. The video switch 35 applies the monochrome video signals via amplifier 23 to the CRT beam current control grid to modulate the electron beam as it scans over the identical effectively blue-phosphor stripes.

As in the embodiment of FIG. 2 the monochrome image is generated with a resolution of at least one phosphor stripe pitch and, at least as far as the principally red and green stripe locations are concerned, at a lower intensity consistent with desirable light output for low ambient light viewing conditions whereas the full-colour image is essentially unaffected and is able to benefit from the beam index CRT construction for producing bright colour images for viewing in high ambient light levels.

The blue phosphor stripes 17$_B$ do not require the additional layer of blue phosphor separated by a barrier layer and in the manner described in relation to the embodiment of FIG. 2, the electron beam energy or current may be reduced in synchronism with the indexing signal to reduce the level of emissions from the blue phosphor stripes excited by the scanning electron beam in monochrome operation. Alternatively, the insulating barrier 38 and additional blue phosphor layer 39 may also be applied to the blue phosphor stripes as well as the red and green ones so that the two operating modes, monochrome and full-colour, are kept separate by simple choice of electron beam energy, a uniform level of blue light being produced in monochrome image mode from all stripe locations by excitation of the same amount of phosphor in the phosphor layer and nonexcitation of the principal phosphor of the stripe location.

Such an arrangement has advantages in the simplicity of controlling the image formation in the two modes and in permitting variation in the precise spectral emission content of the blue phosphor used for monochrome viewing from the blue phosphor used for full colour viewing, which has to be balanced with the spectral emission characteristics of the red and green phosphors. For instance, to minimise eye strain the emission may be shifted towards the blue-green part of the spectrum.

It will be appreciated that the use of the penetration principle and different electron beam energies in order to distinguish between formation of full colour and monochrome images may be applied with different structures of the screen phosphors.

FIG. 4 shows magnified a cross section through the screen portion in which the red and green, and if desired, blue stripes are formed of phosphor particles 40 for emitting the principal stripe colour coated with an electrically insulating barrier layer 41, corresponding to the barrier 38 of FIG. 3, itself coated with a layer or skin 42 of the blue monochrome phosphor. Thus depending upon the electron beam energy employed in image formation, any phosphor stripe produces either the monochrome blue by excitation only of the outer skin phosphor or the principal colour associated with that stripe by excitation of both the outer skin and the particle cores, the relative efficiencies between the principal and monochrome phosphors permitting emissions of the latter to be ignored in comparison with those of the former.

To the extent that phosphors emitting at the blue end of the spectrum are less efficient than phosphors emitting at other wavelengths, that the sensitivity of the eye to such blue light is less than to the colours produced by the other principal (red and green) phosphors and that such other colours may contain some blue emissions without detracting from the perceived colour purity, uncoated blue phosphors particles may be mixed with the blue-coated red and green phosphors particles 40, as shown in FIG. 5 in sufficiently low concentration that their excitation by the electron beam energy in either operating mode produces emissions which do not detract from the principal phosphor stripe colour in a full-colour image whilst adding to the luminance of a monochrome image.

Although the electron beam energy may be changed when scanning across the blue phosphor stripe in order to equalise the display luminance the relationship between beam position and the modulating video signal is irrelevant in forming a monochrome image. Whereas the provision of blue monochrome phosphors at each of the stripe locations in itself provides an order of magnitude increase in image resolution from triplet to stripe width the resolution may be further improved to sub-stripe dimensions by the formation of a lower energy electron beam having smaller dimension in the scanning direction.

If the perceived image resolution is affected by the discrete phosphor stripe structure it will be appreciated that the best monochrome resolution will be available using variants of beam-index screen constructions with minimal widths of guard stripes between phosphors and with indexing stripes that do not restrict the emission of the monochrome radiation.

For example, with the lower energy beam of monochrome operation an index stripe, if required, may need dimensions or material which serve to prohibit the beam from exciting the desired phosphor materials. The display may then be adapted to respond to forwardly emitted radiation, say blue, so that the beam energy is controlled to give a uniform level of blue luminance.

As a precaution against any eye fatigue arising from the use of one colour, particularly at the extreme of the visible spectrum, front lighting in a complementary colour, in this case yellow, may be used from a wedge-shaped light guide or bezel around the periphery screen to effect a background lighting on the screen or filter, where used, complementary to the phosphor emission.

Furthermore, active or passive contrast enhancement filters may be used to improve image visibility in bright ambient lighting conditions.

The embodiments described hereinbefore with respect to FIGS. 2 to 4 all have the primary colour blue chosen as the monochrome colour with the additional blue monochrome phosphor being used in association with at least the red and green primary colour phosphors.

It will be appreciated from the foregoing that where it is intended for use with additional viewing equipment for which monochrome radiation at the red end of the spectrum is unsuitable the monochrome colour chosen may equally be the colour of the primary green phosphor or a mixture of green and blue.

If there is no other reason for excluding red as the monochrome radiation then the monochrome emissions may equally be produced at the red end of the spectrum.

As described hereinbefore the beam index CRT represents just one form of display device on which multiple colour images can be formed by addressing, usually sequentially, groups of individually energisable colour emitters, the phosphor stripes energised by excitation with an electron beam. The groups need not form triplets, or the equivalent, of three primary colours red, green and blue, to give a full colour image but fewer or alternative colours may be employed to give multiple colour image capability, with the monochrome phosphor added to some or all of the principal colour phosphor as appropriate.

It will be seen that other forms of device with correspondence between colour image pixel-forming groups and the individually energisable component emitters of those groups can benefit from the invention.

Another cathodoluminescent device is the so-called vacuum fluorescence device in which a phosphor coated electrode has an individual electron beam incident thereon to cause light emission and defined by the appropriate energisation of electrodes. By physically grouping electrodes having phosphors of different colour emissions the groups may be addressed and the electrodes energised to produce the appropriate colours for multiple colour display, the group again defining a colour image pixel. Arranging for each of the phosphors also to emit monochrome radiation, either permanently (with external filter) or only at low energisation, the monochrome image resolution is enhanced to the dimensions of each phosphor coated electrode not the group of the colour image pixel.

Plasma display panels are also known comprising a matrix of selectively addressable and energisable discharge cells in which an ionised plasma may be formed. The discharge plasma is often arranged to have a visible colour and a monochrome two dimensional display provided by the matrix of cells but it is also known to employ fluorescent or phosphorescent materials to give chosen colours and for groups of cells each associated with a different primary colour to form pixels of a multiple colour image display. Such a device is described in GB Patent Specification No. 1,085,880. Depending on the type of colour emitter used, the light may be generated by the electrically charged particles of the plasma or by excitation by appropriate wavelengths of electromagnetic energy in the plasma, for example ultra-violet. It will be seen that by arranging for excitable fluorescent materials of the primary colours to contain the desired monochrome material a dual multiple-colour/-monochrome image display is formed with the resolution for monochrome image increased.

Likewise for electroluminescent flat panel displays primary colours are generated at three adjacent pixels constituting a triad group. Small proportions of monochrome phosphor can be added to the electroluminescent phosphors as for the CRT.

It will be appreciated that within the different devices to which the invention is applicable alternative arrangements may be provided for associating the monochrome phosphor with the principal colour phosphors. In the arrangement of FIG. 2, where both principal colour and monochrome phosphor types are excited together at all times, instead of mixing the two phosphor types uniformly so that they both extend coextensively over the same area of emission they may be kept separate and each confined to separate areas. The monochrome phosphor, because of the relatively low concentration required in any display area at which a pixel is defined by the area of the electron beam or a matrix cell, will occupy only a small proportion of the total phosphor area on which the electron beam or other exciting energy is incident and will not detract from the principal colour emission when a full colour image is produced. Such an arrangement is particularly suited to phosphor combinations which will not mix or are not suited to the coating constructions of FIGS. 3 to 5.

The constructional technique may be combined with the isolation barrier shown in FIGS. 3 to 5. With the colour and monochrome phosphors disposed side by side in discrete areas such an isolation barrier may be provided on the principal colour phosphor, either as a layer over the whole, or as granule skins, but with the monochrome phosphor deposited on its discrete region uncoated. The monochrome phosphor is thus excited for all energies of excitement whereas the principal colour phosphor is only excited for higher energies associated with the colour image display mode.

In all of the above described devices the colour emissions are produced by an emitter in the form of an excitable phosphor or the like. It will be appreciated that the display emitters need not be of such a form but can be provided by coloured filters interposed between the viewer and a source of white light, such as in a display device wherein display image pixels are defined by a matrix of liquid crystal shutters of small dimensions, each of which has associated therewith a pixel-sized coloured dye filter, in a panel illuminated by a back light.

Each pixel is defined by a region of liquid crystal material, commonly a twisted rematic liquid crystal, between opposing electrodes which acts as an electro-optic shutter to pass or block white light from the back-light source which is usually a fluorescent tube. The pixel-sized colour filter associated with each liquid crystal pixel is commonly an isotropic dye which determines the 'emitted' colour of the pixel light when viewed from the front.

In accordance with the present invention the filter associated with each pixel may be provided, for part of the area of the pixel, with a different dye producing the monochrome colour. Thus each pixel normally produces light of the principal colour assigned to the pixel by the major filter dye component as well as a proportion of the monochrome radiation small enough not to contaminate the perceived colour. An electro-optic, or otherwise introduced, filter of the type described with reference to FIG. 2 is employed between the liquid crystal device and the viewer and operated to select the passage of colour or monochrome light at will.

I claim:

1. A display device including a multiple colour visual display device for producing a multiple colour image as a two-dimensional array of image pixels, each pixel being defined by an addressable group of individually energizable three primary colour emitters, each emitter being associated with a physically discrete region of display area and energizable alone or with others to define emission of primary or secondary colours respectively from the group, said display device being adapted to provide a monochrome visual display by emission of radiation of a predetermined monochrome colour, said display device comprising groups of three primary colour emitters affording individual or combined emissions defining said multiple colours, at least some primary colour emitters of each group emitting light in other than said monochrome colour, means for addressing said groups in accordance with formation of a two-dimensional image by energizing the emitters of the groups and, associated at least with the primary colour emitters which emit other than said monochrome colour, an energizable monochrome colour emitter at a lower luminous intensity than the principal colours of the primary colour emitters with which they are associated, whereby each of the discrete regions of said display area may emit said monochrome color, mode control means operable to cause the display of multiple colour images by causing the energization of the emitters of said groups in accordance with the image colour to be generated to produce said principal coloured light at greater luminous intensity than any emission from the monochrome colour emitter associated therewith, and to cause the display of monochrome images by causing the image to be formed by energization of the individual emitters irrespective of their principally emitted colour and to limit light emission from any such emitter energized to that of said monochrome colour.

2. A visual display device as claimed in claim 1 in which each individually energizable colour emitter is arranged to share a common emission area for image forming with the monochrome colour emitter associated therewith.

3. A visual display device as claimed in claim 2 in which the primary colour emitter and monochrome colour emitter comprise discrete areas of said display area.

4. A visual display device as claimed in claim 1 in which the mode control means includes an optical filter disposed between the display emitters and the viewer and operable to transmit light only of said monochrome colour.

5. A visual display device as claimed in claim 4 in which the filter is an electro-optic filter arranged to be electrically switchable between a state of being transmissive only of light of said monochrome colour and a state of being transmissive to substantially all visible wavelengths.

6. A visual display device as claimed in claim 1 in which the individually energizable emitters are defined by selectable areas of excitable phosphor material arranged to form a display area viewed by a viewer and, in which associated with at least the selectable areas of phosphor materials whose principal colour emissions are not of the monochrome colour, is an excitable phosphor, emissive of said monochrome colour at a lower luminous intensity than the principal colour emission of the selectable phosphor area for the same excitation, and the mode control means is operable to display colour images by permitting excitement of selected phosphor areas to excite both the principal colour and monochrome colour phosphors associated therewith in accordance with the colour image to be displayed, to produce light at the principal colour dominating the monochrome colour produced therewith, and to display monochrome images by excitation of said phosphor areas in accordance with the monochrome image, irrespective of excited phosphor colour, and limit light emission therefrom to that provided by the monochrome colour phosphor associated therewith.

7. A visual display device as claimed in claim 6 in which each primary colour emitter and associated monochrome colour emitter share a common display emission area and the monochrome colour phosphor is mixed integrally with the phosphors principally of different colours, whereby excitement of the combined phosphor to cause emissions of said monochrome colour also causes emission of said principal colour.

8. A visual display device as claimed in claim 6 in which each primary colour emitter and associated monochrome colour emitter share a common display emission area and the monochrome colour phosphor is formed as a layer separated from the principal colour phosphor of a selectable area by an electrically insulating barrier layer operable to define an excitement energy differential for the monochrome colour phosphor and principal colour phosphor.

9. A visual display device as claimed in claim 8 in which said barrier layer extends across all of the selectable principal colour phosphor areas and the monochrome phosphor is deposited thereon as a uniform layer extending over the whole of the principal colour phosphor areas.

10. A visual display device as claimed in claim 8 in which said barrier layer is formed as a skin about each grain of the principal colour phosphor with which the monochrome phosphors are associated and said monochrome phosphor is formed as a skin on the barrier layer.

11. A visual display device as claimed in claim 8 in which the mode control means is operable to display monochrome images by defining a phosphor excitation sufficient to excite only the monochrome phosphor without penetrating the barrier layer and is operable to display colour images by defining an excitation energy sufficient to penetrate the barrier layer to excite the associated principal colour phosphor as well as the monochrome phosphor.

12. A visual display device as claimed in claim 1 in which the monochrome colour corresponds to one of the principal emission colours of the groups of emitter.

13. A visual display device as claimed in claim 6 in which the monochrome colour corresponds to one of the principal emission colours of the groups of emitters and the principal colour emitter whose emission corresponds to the monochrome emission has no separate monochrome colour emitter associated therewith.

14. A visual display device as claimed in claim 13 in which the mode control means is arranged to control the excitation of the principal colour emitter in the monochrome image display state to reduce the level of monochrome colour emission to the level obtained from monochrome colour emitter assocaited with other principal colour emitters.

15. A visual display device as claimed in claim 6 comprising a cathode ray tube having a display screen across which extends a repetitive sequence of principally red, green and blue emissive phosphor areas and defining said principal colour emitters arranged as stripes, means to direct an electron beam of selectable energy at the screen to excite the phosphor stripes, means to effect scanning of the beam by indexing it between the locations of the phosphor stripes and, associated at least with phosphor stripes whose principal emission colours are not the monochrome colour, a monochrome colour phosphor material excitable by the electron beam to produce light at a lower luminous intensity than the principal colours of the phosphor stripes with which associated, said mode control means being arranged to display colour images by causing the electron beam to excite the principal colour phosphors of the stripe in accordance with both electron beam indexing across the stripes and the image colour to be generated to produce said principal colour light at greater luminous intensity than any emission from the associated monochrome colour phosphor excited therewith and to display monochrome colour images by indexing between each phosphor stripe in turn irrespective of its principally emitted colour and to limit light emission from any such stripe position to that provided by the monochrome colour phosphor associated therewith.

16. A visual display device as claimed in claim 15 in which each primary colour emitter and monochrome color emitter share a common display emission area, the monochrome color phosphor is formed as a layer separated from the principal colour phosphor of a selectable area by an electrically insulating barrier layer operable to define an excitement energy differential for the monochrome colour phosphor and principal colour phosphor and the barrier layer extends across all of the stripes of the screen area and the monochrome colour phosphor is deposited as a uniform layer extending over the whole area of the screen separated from said principal colour phosphor stripes.

17. A visual display device as claimed in claim 15 in which the monochrome colour corresponds to one of the principal emission colours of the groups of emitters and the principal colour emitter whose emission corresponds to the monochrome colour has no separate monochrome colour emitter associated therewith, in which the mode control means is arranged to control the excitation of the principal colour emitter in a monochrome image display to reduce the level of monochrome colour emission to the level obtained from the monochrome colour emitter associated with other principal colour emitters, and in which the phosphor excitation electron beam is reduced in energy in monochrome colour operation to reduce the level of monochrome colour emitted from the principal colour phosphor having principal emission of the monochrome colour.

18. A visual display device as claimed in claim 1 in which the monochrome colour is in the green to blue part of the visible spectrum.

19. A visual display device as claimed in claim 18 in which the monochrome colour is in the blue part of the visible spectrum.

* * * * *